US012617407B2

(12) United States Patent　　(10) Patent No.:　US 12,617,407 B2

Salif et al.　　(45) Date of Patent:　May 5, 2026

(54) METHOD FOR CONTROLLING A HEAVY-DUTY VEHICLE

(71) Applicant: Volvo Truck Corporation, Gothenburg (SE)

(72) Inventors: Ramadan Salif, Gothenburg (SE); Viktor Lägnert, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 147 days.

(21) Appl. No.: 18/093,397

(22) Filed: Jan. 5, 2023

(65) Prior Publication Data

US 2023/0242121 A1　　Aug. 3, 2023

(30) Foreign Application Priority Data

Jan. 28, 2022　　(EP) ..................................... 22153941

(51) Int. Cl.
*B60W 30/188*　　(2012.01)
*B60W 10/04*　　(2006.01)
*B60W 10/18*　　(2012.01)

(52) U.S. Cl.
CPC .......... *B60W 30/188* (2013.01); *B60W 10/04* (2013.01); *B60W 10/18* (2013.01);
(Continued)

(58) Field of Classification Search
CPC .... B60W 30/188; B60W 10/04; B60W 10/18; B60W 2520/26; B60W 2520/266; B60T 2270/213; B60T 8/1764; B60T 8/175
See application file for complete search history.

(56) References Cited

U.S. PATENT DOCUMENTS 3,981,545 A * 9/1976 Eddy ....................... B60T 8/175
　　　　　　　　　　　　　　　　188/170
4,344,139 A * 8/1982 Miller ................. B60T 8/17616
　　　　　　　　　　　　　　　　303/122.04
(Continued)

FOREIGN PATENT DOCUMENTS

DE　　　19933085 A1　　1/2001
EP　　　0126051 A2　　11/1984
EP　　　0126051 A3　　10/1986

OTHER PUBLICATIONS

Extended European Search Report for European Patent Application No. 22153941.4, mailed Jul. 7, 2022, 7 pages.

*Primary Examiner* — Lindsay M Low
*Assistant Examiner* — Brian R Kirby
(74) *Attorney, Agent, or Firm* — Withrow & Terranova, PLLC

(57)　　ABSTRACT

A method for controlling a powertrain system of a heavy-duty vehicle, the powertrain system having at least one differential arrangement for receiving torque from a propulsion unit of the powertrain system and delivering at least a part of the torque to a set of first and second wheels, the method being implemented by a control unit, the method comprising determining a split-friction condition indicative of a wheel slip difference between the first and second wheels, wherein one of the first and second wheels defines a high-friction side of the differential arrangement and the other one of the first and second wheels defines a low-friction side of the differential arrangement; determining a target wheel slip for the high-friction side; and in response to the determined split-friction condition; controlling a brake force on the low-friction side of the differential arrangement based on the target wheel slip on the high-friction side.

12 Claims, 4 Drawing Sheets

(52) U.S. Cl.
CPC ..... *B60W 2520/26* (2013.01); *B60W 2520/28* (2013.01); *B60W 2710/06* (2013.01); *B60W 2710/08* (2013.01); *B60W 2710/28* (2013.01)

(56) References Cited

U.S. PATENT DOCUMENTS

| | | | | |
|---|---|---|---|---|
| 4,583,611 A * | 4/1986 | Frank | B60T 8/175 | 180/197 |
| 4,766,972 A * | 8/1988 | Takata | B60T 8/175 | 180/197 |
| 4,779,696 A * | 10/1988 | Harada | B60T 8/175 | 180/197 |
| 4,823,269 A * | 4/1989 | Fujioka | B60T 8/175 | 303/154 |
| 4,947,332 A * | 8/1990 | Ghoneim | B60T 8/172 | 701/84 |
| 4,976,329 A * | 12/1990 | Ise | B60T 8/175 | 180/197 |
| 5,041,978 A * | 8/1991 | Nakayama | B60K 23/0808 | 701/84 |
| 5,070,461 A * | 12/1991 | Nobumoto | B60T 8/48 | 701/87 |
| 5,205,622 A * | 4/1993 | Gee | B60T 8/175 | 303/113.5 |
| 5,241,479 A * | 8/1993 | Matsuda | B60T 8/48 | 303/189 |
| 5,263,548 A * | 11/1993 | Tsuyama | B60T 8/175 | 701/84 |
| 5,295,552 A * | 3/1994 | Kageyama | B60T 8/175 | 180/197 |
| 5,564,796 A * | 10/1996 | Saito | B60T 8/326 | 303/112 |
| 5,688,029 A * | 11/1997 | Bach | B60T 8/175 | 303/139 |
| 5,741,051 A * | 4/1998 | Nakashima | B60T 8/175 | 180/197 |
| 5,980,000 A * | 11/1999 | Kolbe | B60T 8/175 | 303/139 |
| 6,533,367 B1 * | 3/2003 | Latarnik | B60T 8/175 | 303/113.2 |
| 6,755,488 B2 * | 6/2004 | Fawkes | B60K 28/16 | 303/142 |
| 6,923,514 B1 * | 8/2005 | Spieker | B60T 8/1755 | 180/197 |
| 7,434,896 B2 * | 10/2008 | Sauter | B60T 8/175 | 303/192 |
| 8,352,145 B2 * | 1/2013 | Uematsu | B60T 8/175 | 180/245 |
| 8,706,378 B2 * | 4/2014 | Choby | B60T 8/175 | 701/84 |
| 2003/0028308 A1 * | 2/2003 | Ishikawa | B60T 8/1764 | 701/73 |
| 2003/0229439 A1 * | 12/2003 | Polzin | B60T 8/175 | 701/90 |
| 2004/0029682 A1 * | 2/2004 | Sauter | F16H 41/30 | 477/97 |
| 2005/0209751 A1 * | 9/2005 | Kato | B62D 6/003 | 701/41 |
| 2012/0130616 A1 * | 5/2012 | Caspari | B60W 30/18172 | 701/70 |
| 2016/0356370 A1 * | 12/2016 | Richards | B60W 10/16 | |
| 2017/0183008 A1 * | 6/2017 | Isono | B60W 30/18172 | |
| 2020/0130660 A1 * | 4/2020 | Cho | B60T 8/1764 | |
| 2022/0126801 A1 * | 4/2022 | Laine | B60T 8/1761 | |
| 2023/0039043 A1 * | 2/2023 | Jeon | B60W 10/184 | |
| 2023/0068987 A1 * | 3/2023 | Laine | B60L 3/0061 | |

* cited by examiner 300, 305

400

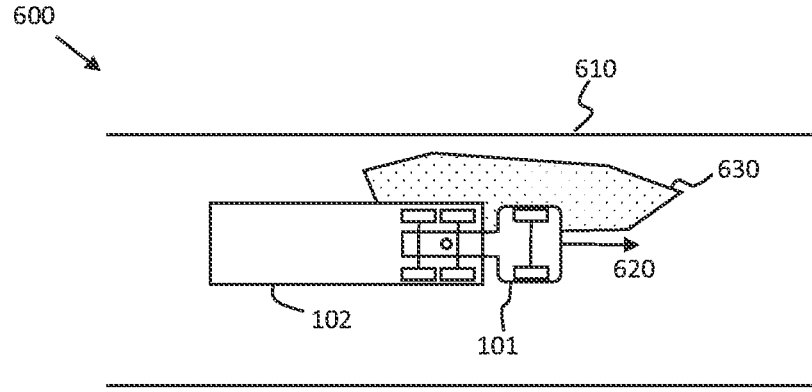
FIG. 5
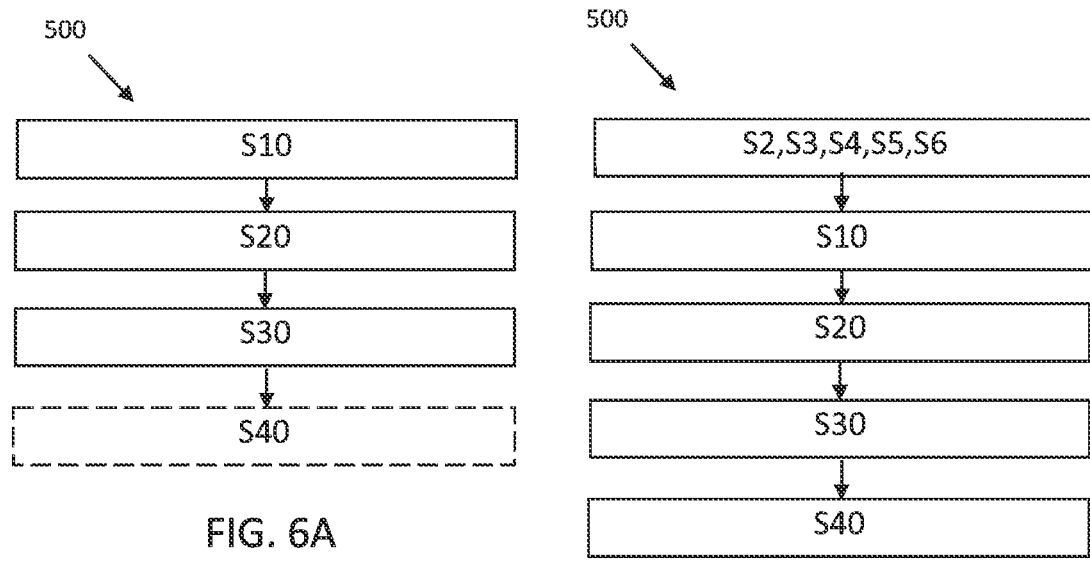
FIG. 6A
FIG. 6B

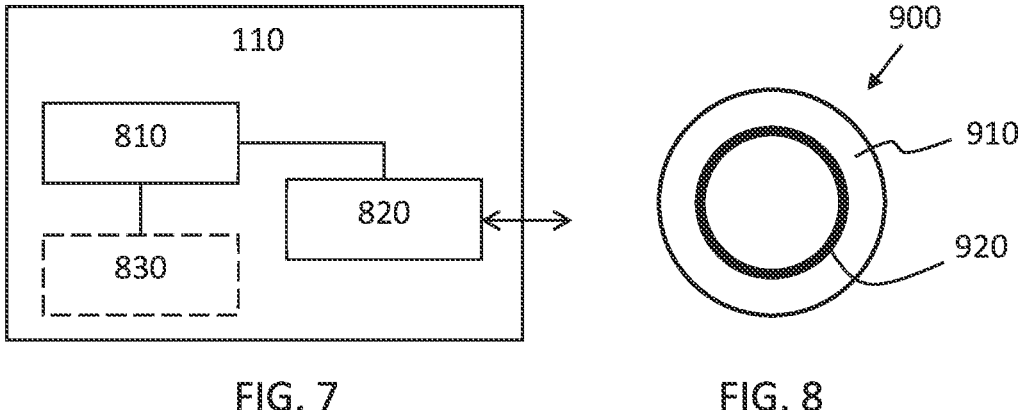
FIG. 7                    FIG. 8

METHOD FOR CONTROLLING A HEAVY-DUTY VEHICLE

RELATED APPLICATIONS

The present application claims priority to European Patent Application No. 22153941.4, filed on Jan. 28, 2022, and entitled "METHOD FOR CONTROLLING A HEAVY-DUTY VEHICLE," which is incorporated herein by reference in its entirety.

TECHNICAL FIELD

The present disclosure relates to methods and control units for controlling a powertrain system of a vehicle, such as a heavy-duty vehicle. In particular, the present disclosure relates to a method for controlling a powertrain system having a differential arrangement configured to be coupled to a propulsion unit. By way of example, the differential arrangement comprises an open differential. The present disclosure can be applied in heavy-duty vehicles, such as trucks and construction equipment. Although the present disclosure will be described mainly with respect to cargo transport vehicles such as semi-trailer vehicles and trucks, the disclosure is not restricted to this particular type of vehicle but may also be used in other types of vehicles such as electrically powered dolly units and passenger cars.

BACKGROUND

Heavy-duty vehicles, such as trucks and semi-trailer vehicles, are designed to carry heavy loads. Occasionally, such vehicles may be subject to so called split friction road conditions resulting in traction loss due to different friction between the wheels of the vehicle and the road. Such road conditions may occur e.g. in cold climates when one side of the lane is covered with snow or ice, and the other side is bare ground.

In order to provide appropriate startability and tractive force in split friction conditions, the spinning wheel(s) of one or more wheel shafts of the vehicle may generally need to be braked in order to transfer torque to a high friction side of the wheel shafts. In many vehicle powertrain system for heavy-duty vehicles, this transfer of torque between the low friction side and the high friction side is provided by using a differential.

A differential is a drive arrangement comprising three shafts. It has the property that the rotational speed of one shaft is the average of the speeds of the others, or at least a fixed multiple of that average. Another property is that during braking and propulsion, the wheel shafts will split the wheel longitudinal forces equally over the wheels. As such, the wheel force can be limited by the smallest force available from the left and right tyres.

In trucks and other wheeled vehicles, the differential allows an outer drive wheel to rotate faster than an inner drive wheel during a turn. This may be beneficial as the vehicle turns, making the wheel that is traveling around the outside of the turning curve to roll farther than the other. The average of the rotational speed of the two driving wheels equals the input rotational speed of the drive shaft. An increase in the speed of one wheel is balanced by a decrease in the speed of the other.

A differential normally transfers an equal amount of torque from the drive shaft to both wheels. However, if one wheel requires less power to turn than the other wheel, such as when one wheel is on dry pavement and the other on a muddy shoulder or on a spot of ice, it will take less torque to turn the wheel experiencing lower friction than to turn the wheel on the high friction roadway. By means of the mechanical function of the differential, such as an open differential, the wheel speeds between e.g. right and left sides can therefore spin at different speeds with respect to each other.

Current traction control systems are usually configured to monitor the wheel speed signals to control the most spinning wheel or distribute brake torque to transfer according to the detected split friction condition. However, such systems may not always reflect the real conditions between the vehicle and the road. The problem may often be that the traction control function itself is configured to be suboptimized by calibration to work on unrealistic real conditions, such as asphalt/polished ice or basalt. In reality, the friction coefficients may be much closer to each other and the calibrated suboptimized function, causing the traction control function to provide unnecessary braking. Such excessive braking control may tear up the ground for the high friction wheel(s) causing even worse traction conditions for the vehicle.

It would thus be desirable to provide a smoother traction control in view of the vehicle operation and the prevailing road surface conditions so as to provide an improved performance of the vehicle.

SUMMARY

It is an object of the present disclosure to provide an improved split friction handling for a vehicle so as to enhance the transfer of traction force. This object is achieved by a method according to claim 1. The objective is also achieved by the other independent claims. The dependent claims are directed to advantageous embodiments of the disclosure.

According to a first aspect, there is provided a method for controlling a powertrain system of a heavy-duty vehicle. The powertrain system comprises at least one differential arrangement for receiving torque from a propulsion unit of the powertrain system and delivering at least a part of the torque to a set of first and second wheels. The method is implemented by a control unit. The method comprises determining a split-friction condition indicative of a wheel slip difference between the first and second wheels, wherein one of the first and second wheels defines a high-friction side of the differential arrangement and the other one of the first and second wheels defines a low-friction side of the differential arrangement; determining a target wheel slip for the high-friction side; and, in response to the determined split-friction condition; controlling a brake force on the low-friction side of the differential arrangement based on the target wheel slip on the high-friction side.

Hereby, the proposed method provides for controlling the powertrain of the vehicle on the basis of the desired slip of the wheel on the high friction side of the vehicle during split friction conditions. In particular, the proposed method provides for dynamically controlling the amount of brake force applied at a low friction side in a split-friction condition such that the wheel speed at the high friction side agrees with a desired wheel slip value, here corresponding to the target wheel slip. This is contrary to known methods where traction control is performed in a more abrupt manner by using one or more thresholds.

The present disclosure is at least partly based on the insight that current traction control functions are not appropriately defined for real scenarios. In addition, hitherto known traction actuator control systems are generally based on the differential speeds of the wheels, rather than considering the slip of the wheel on the high friction side of the vehicle.

The proposed method further allows for an improved detection of the split friction condition, e.g. by monitoring the individual wheel speeds of the vehicle.

Typically, the method may be configured to control the brake force and a propulsion unit speed using the wheel slip of the wheel on the high friction side in order to obtain an improved split friction handling for the vehicle.

By controlling the brake force (such as a brake pressure of a brake device or a brake torque of one or more wheel-in-hub motors) using the target wheel slip of the high friction side as an input control parameter, the proposed method is capable of improving the traction control of the powertrain system and the vehicle. Assuming e.g. a driving and road situation where there is an overshoot of slip on the high friction side as an effect of a heavy and excessive brake torque. In these types of situations, the proposed method provides for using the spinning wheel as a target (limit) and subsequently reduce the torque from the propulsion unit. The proposed method may also have a positive impact on the brake system as the brake pressure of the brake system may generally also decrease when the powertrain system is controlled on the basis of a certain slip target on the high friction side wheel.

Typically, the brake force on the low-friction side of the differential arrangement is controlled until a wheel speed at the high friction side agrees with the determined target wheel slip on the high-friction side. As such, the proposed method comprises controlling the braking force dynamically to obtain the target wheel slip at the high friction side.

The provision of controlling the brake force on the low-friction side of the differential arrangement may typically comprise controlling the revolution of an input axle of the differential arrangement based on the target wheel slip for the high-friction side. As such, the method comprises controlling the braking force dynamically to obtain the target wheel slip at the high friction side by controlling the revolution of the input axle of the differential arrangement based on the target wheel slip for the high-friction side. Hereby, it becomes possible to provide an energy-efficient control of the brake force and also a relatively fast response of the control, at least for certain types of powertrain systems.

The provision of controlling the brake force on the low-friction side of the differential arrangement may comprise controlling a brake pressure from the service brake.

According to one example embodiment, if a wheel slip on the high-friction side exceeds the target wheel slip on the high-friction side, the method may further comprise reducing a torque from the propulsion unit based on the target wheel slip on the high-friction side.

The split-friction condition may be detected by monitoring the individual wheel speeds of the first and second wheels and further comparing the wheel speeds of the first and second wheels with each other. The split-friction condition is defined by a difference in slip between the high-friction wheel side and the low-friction wheel side. The high-friction wheel side amounts to the wheel rotating with the lowest wheel speed among the first and second wheels, while the low-friction wheel side amounts to the wheel rotating with the highest wheel speed among the first and second wheels.

The individual wheel speeds of the first and second wheels can be determined in several different ways. By way of example, the individual wheel speeds of the first and second wheels are determined by wheel speeds sensors arranged and configured to determine a corresponding wheel speeds of the first and second wheels.

The propulsion unit may be any one of an electric machine, a fuel cell system having at least one electric machine, and an internal combustion engine. The propulsion unit is an energy converting unit configured to output a torque. The proposed method is particularly suitable for an electrically powered vehicle having one or more electric machines arranged to propel the vehicle. These electric machines are often capable of generating significant torque already at low speeds, which may cause severe wheel slip if the requested torque is not carefully controlled. The electric machine may be connected to an energy storage system such as traction battery system. The propulsion unit may also refer to any one of a combination of at least an electric machine and an internal combustion engine, a combination of at least an electric machine and a fuel cell system, an electric machine and a traction battery. The internal combustion engine may be any one of a diesel internal combustion engine, a hydrogen internal combustion engine and a gasoline internal combustion engine.

The method may comprise configuring a first wheel slip control module associated with the first driven wheel, and a second wheel slip control module associated with the second driven wheel, determining, by each wheel slip control module, an obtainable torque for the respective wheel based on a comparison between a current wheel state and the target wheel slip for the high-friction side, receiving a requested acceleration profile by the vehicle, determining a required torque to satisfy the requested acceleration profile, and requesting a torque from the propulsion unit corresponding to the smallest torque out of the obtainable torques for each driven wheel and the required torque.

According to a second aspect, there is provided a control unit for performing the method according to any one of the steps, provision and/or embodiments of the first aspect.

The control unit may comprise a first wheel slip control module associated with a first driven wheel, and a second wheel slip control module associated with a second driven wheel. Moreover, each wheel slip control module is arranged to determine an obtainable torque by the respective wheel based on a comparison between a current wheel state and the target wheel slip for the high-friction side. The control unit is also arranged to determine a required torque to satisfy a requested acceleration profile by the vehicle, and to request a torque from the propulsion unit corresponding to the smallest torque out of the obtainable torques for each driven wheel and the required torque.

In this manner, the torque applied by the propulsion unit is limited in order to avoid undesired levels of wheel slip. The control system accounts for current driving scenario, which is an advantage. Advantageously, a differential locking arrangement can be avoided by the herein proposed techniques.

The current wheel state may comprise wheel speed. Each wheel slip control module may be arranged to obtain a vehicle velocity, to determine a current wheel slip, and to determine the obtainable torque based on a comparison between the current wheel slip and the target wheel slip for the high-friction side.

In this manner, the wheel slip control is efficiently handled by the control unit. The propulsion unit torque may be controlled in dependence of current driving scenario, which is an advantage.

The current wheel state may comprise a current wheel slip value obtained by the wheel slip control module as part of a capability message received from a wheel end module associated with the respective wheel. Each wheel slip control module may be arranged to determine the obtainable torque based on a comparison between the current wheel slip and the target wheel slip for the high-friction side. Hereby, a part of the complexity in the system may be shifted down to the motion support devices (MSD), which may be an advantage in some situations. The data obtained from the MSD device related to current wheel slip can be used in combination with wheel slip information obtained from other sources, thereby increasing system robustness.

The target wheel slip for the high-friction side may generally be determined by the control unit. The target wheel slip for the high-friction side may be obtained based on a pre-determined relationship between tyre force and current wheel slip. This pre-determined relationship allows for optimizing vehicle operation, which is an advantage. A vehicle motion management control system may continuously or intermittently estimate the current tyre/road conditions using known techniques. The predetermined relationship can be established for a given vehicle type, or even for a given vehicle, thereby accounting for individual characteristics related to the vehicle for a more tailored control strategy, which is an advantage.

The control unit may be arranged to obtain an estimated road friction coefficient and the target wheel slip for the high-friction side may be obtained based on a pre-determined lookup table indexed by the estimated road friction coefficient. Thus, the vehicle operation is adjusted in dependence of current road friction, thereby increasing control accuracy.

The target wheel slip for the high-friction side may generally refer to a configurable wheel slip limit, as further described herein.

The current wheel state may comprise an estimated road friction coefficient and an estimated tyre normal force for each driven wheel. Each wheel slip control module is arranged to determine the obtainable torque based on a relationship $$T_i = \mu_i * F_{zi} * r_{wi}$$

where $r_{wi}$ is a wheel radius of the i:th driven wheel. This way to determine obtainable torque can be used separately or in combination with other methods, thereby improving system robustness.

Each wheel slip control module may be arranged to obtain a capability message from a wheel end module associated with the respective driven wheel, wherein the capability message comprises the obtainable torque. This way some of the system complexity can be shifted down to the MSD, which may be an advantage in some scenarios. For instance, controller sampling and data transmission between units may be simplified since the system complexity is shifted closer to the wheel. In particular, the data traffic between MSD and VMM may be reduced.

The first and second driven wheels may be arranged to be braked by respective first and second service brakes. Each service brake may be controlled by a respective wheel end module to maintain wheel slip below a configured wheel slip limit. The control module may be arranged to configure the wheel slip limits. This gives the control module additional options for optimizing vehicle performance, as will be explained in the following.

The control unit may also be arranged to detect a split friction condition. Each wheel slip control module may be arranged to configure a torque to be applied by a corresponding service brake to maintain positive wheel slip below a wheel slip limit, when having detected a split friction condition. This way vehicle operation in split friction conditions is improved, which is an advantage.

The control unit may also be arranged to reduce the requested torque from the drive unit in case both of the wheel slip control modules configure a torque to be applied by the corresponding service brake in response to a positive wheel slip above the configured wheel slip limit. This way vehicle operation in split friction conditions is further improved, which is an advantage.

The control unit may be arranged to configure a torque to be applied by the corresponding service brake based on a requested curvature to modify an understeer gradient associated with the vehicle in dependence of the requested curvature. This allows the vehicle to better negotiate curves, which is an advantage.

The control unit may be arranged to configure a higher wheel slip limit for the service brakes compared to a wheel slip limit of the electric machine. This way the service brakes assume a back-up role to safeguard vehicle operation which will be explained in more detail below.

According to a third aspect, there is provided a vehicle comprising a control unit according to the second aspect.

According to a fourth aspect, there is provided a computer program comprising program code means for performing any one of the steps, provision and/or embodiments of the first aspect when the program is run on a computer or on processing circuitry of a control unit.

Further effects and features of the second, third and fourth aspects are largely analogous to those described above in relation to the first aspect.

There is also disclosed herein methods, computer programs, computer readable media, computer program products, brake systems and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings:

FIG. 5 illustrates a vehicle operating scenario;

FIG. 6A is a flow chart illustrating a method;

FIG. 6B is a flow chart illustrating a method;

FIG. 7 schematically illustrates a control unit; and

FIG. 8 shows an example computer program product.

DETAILED DESCRIPTION

Figures 1A, 1B, 2:
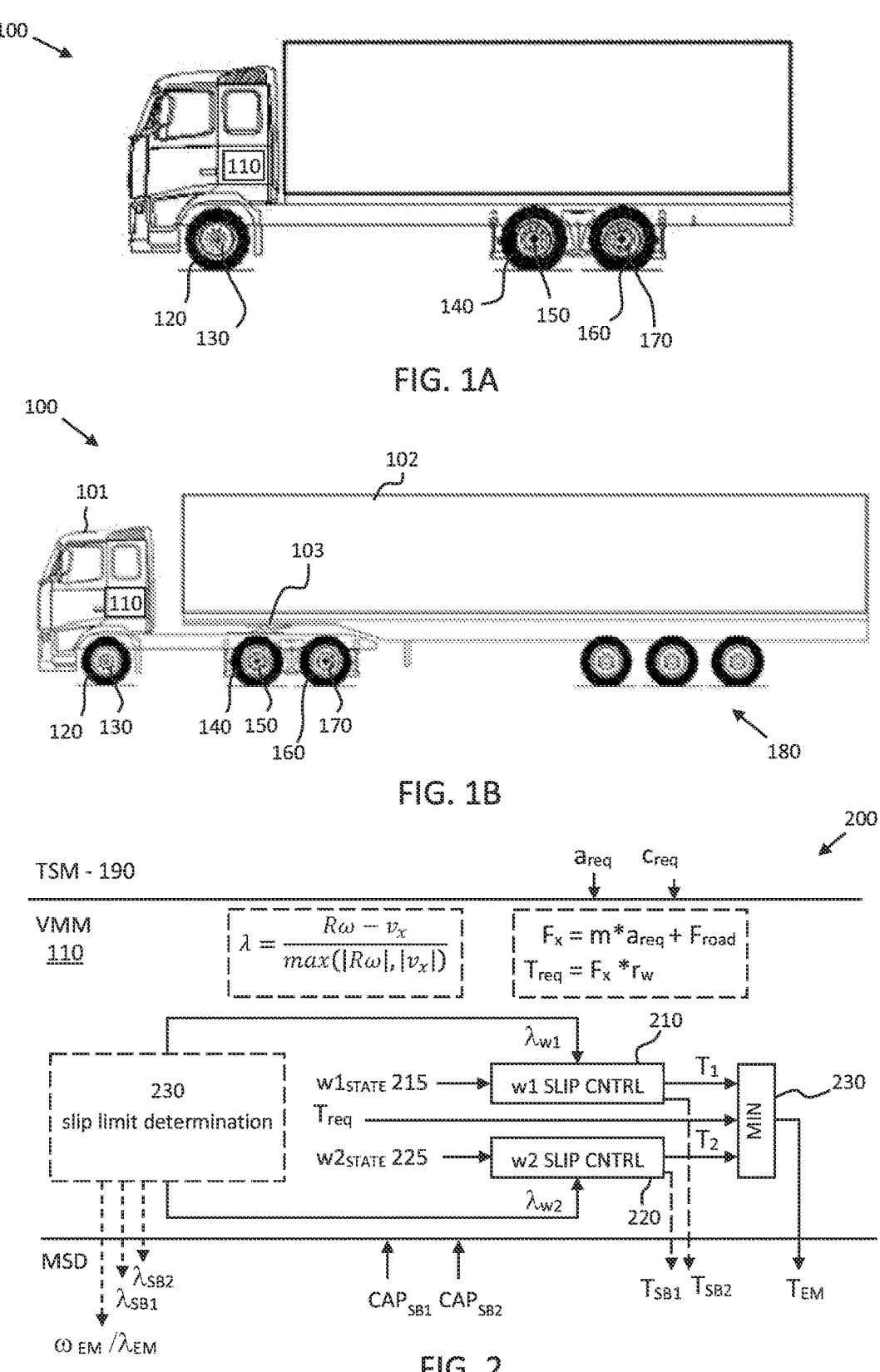
FIGS. 1A-B schematically illustrate some example heavy duty vehicles.
FIG. 2 shows an example vehicle control system stack.

The disclosure will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present disclosure is not limited to the embodiments described herein and illustrated in the drawings; rather, the skilled person will recognize that many changes and modifications may be made within the scope of the appended claims.

FIGS. 1A and 1B illustrate example vehicles 100 for cargo transport where the techniques disclosed herein can be applied with advantage. FIG. 1A shows a truck supported on wheels 120, 140, and 160, some of which are driven wheels.

FIG. 1B shows a semitrailer vehicle where a tractor unit 101 tows a trailer unit 102. The front part of the trailer unit 102 is supported by a fifth wheel connection 103, while the rear part of the trailer unit 102 is supported on a set of trailer wheels 180.

Each wheel, or at least a majority of the wheels, is associated with a respective brake device in the form of a wheel service brake 130, 150, 160. The trailer unit wheel brakes are not indicated in FIGS. 1A-1B. This wheel service brake may, e.g., be a pneumatically actuated disc brake or drum brake. The wheel brakes are controlled by brake controllers.

Herein, the terms brake controller, brake modulator, and wheel end module will be used interchangeably. These terms are all to be interpreted as a device which controls applied braking force and potentially also local slip control on at least one wheel of the vehicle, such as the vehicle 100. Each one of the wheel brake controllers is communicatively coupled to a control unit 110, allowing the control unit to communicate with the brake controllers, and thereby control vehicle braking. This control unit may potentially comprise a number of sub-units distributed across the vehicle, or it can be a single physical unit. The control unit 110 may, e.g. allocate a required brake force between wheels to maintain vehicle stability, and even to actively modify vehicle dynamics such as understeer gradient. The control unit 110 may also be part of a larger vehicle control system comprising additional control layers, as will be discussed in more detail below in connection to FIG. 2.

Some of the wheels of the vehicles 100 are driven by a propulsion unit. The propulsion unit may be provided by one or more electrical machines. In other types of arrangement, the propulsion unit may be an internal combustion engine. The propulsion unit is generally an energy converting unit configured to provide a torque. The propulsion unit transfers torque to the wheels via a differential drive arrangement. In other words, some of the wheels of the vehicles 100 are driven by the propulsion unit via the differential drive arrangement. One example of a differential drive arrangement is an open differential. Although the disclosure is mainly focused on open differentials, other forms of differential drive arrangements may also be applicable within the scope of the current discussion.

FIG. 2 schematically shows a control stack 200 in which various vehicle control functions are incorporated. A traffic situation management (TSM) function 190 plans vehicle operation with a time horizon of, e.g., 10 seconds, either by driver input from steering wheels, pedals and the like, or from automated driving functions. Advanced driver assistance (ADAS) systems may also provide input to the TSM function 190. The techniques disclosed herein support both manual, assisted and automated driving. The TSM time frame may for instance corresponds to the time it takes for the vehicle to negotiate a curve, i.e., to transition from driving straight to entering the curve and then exiting the curve again. The vehicle operation comprises vehicle manoeuvres that in turn are associated with acceleration profiles and curvature profiles. The TSM function 190 continuously requests the desired acceleration profiles, $a_{req}$, and curvature profiles, $c_{req}$, from a vehicle motion management (VMM) function. The VMM function is here an integral part of the control unit 110. Hence, for ease of reference, the VVM function may herein be interchangeably denoted with reference 110. The VMM function 110 operates with a time horizon of about 1 second or so, and continuously transforms the acceleration profiles and curvature profiles into control commands for the various motion support device (MSD) functions on the vehicle. Examples of such MSD functions are the service brakes 130, 140, 160. Another MSD function is the electric machine or electric machines arranged to power the vehicle 100. Other MSD functions may be the internal combustion engine and/or the fuel cell system, depending on type of propulsion and driving unit.

The translation between TSM requests (such as acceleration profiles and curvatures) and MSD actions by the VMM function are commonly known and will therefore not be discussed in more detail herein.

The interface between the VMM and the MSD may, e.g., comprise configured service brake wheel slip limits $\lambda_{SB1}$, $\lambda_{SB2}$, configured electric machine wheel slip limits $\lambda_{EM}$, requested service brake torque values $T_{SB1}$, $T_{SB2}$, and requested electrical machine torque $T_{EM}$. The interface may also comprise a requested wheel speed or propulsion unit speed, such as engine speed $\lambda_{EM}$ from the electric machine. The MSD functions then normally feed status and current capabilities back to the VMM function, such as the service brake current capabilities $CAP_{SB1}$ and $CAP_{SB2}$ shown in FIG. 2. This status may, e.g., comprise monitored wheel slip values, detected peak wheel slip, estimated road friction coefficients, and the like. According to some aspects the capability messages comprise obtainable torques by a given wheel, which value has been estimated at the MSD layer.

The obtainable torques may comprise a peak torque value which can be maintained for a limited period of time, and a continuous torque value which can be sustained for longer periods of time. The capability message may also comprise a time period associated with a time duration over which the peak torque can be maintained.

In FIG. 2, the service brake wheel slip limits $\lambda_{SB1}$, $\lambda_{SB2}$, the electric machine wheel slip limits $\lambda_{EM}$, the requested wheel speed or propulsion unit speed, such as the engine speed $\lambda_{EM}$, and the requested service brake torque values $T_{SB1}$, $T_{SB2}$ are optional and therefore not required for basic functionality of the techniques described herein.

According to an example operation, the VMM function 110 shown in FIG. 2 first determines a required longitudinal force $Fx=m*a_{req}+F_{road}$ to meet the requests from the TSM function, based on vehicle mass m, the requested acceleration $a_{req}$ and road resistance $F_{road}$. The road resistance $F_{road}$ may be significant in some driving scenarios, and possible to ignore in other driving scenarios.

The torque corresponding to the required longitudinal force Fx to satisfy the TSM function requests can then be determined as $T_{req}=Fx*r_w$, where $r_w$ is a wheel radius.

It is appreciated that these rudimentary calculations and vehicle models are merely presented by way of example. More advanced models can of course be used with advantage in order to improve model accuracy and overall vehicle control. However, in the interest of brevity, only these rudimentary models will be used herein, and it is noted that more advanced methods are known.

The required torque $T_{req}$ is then compared to obtainable torque values determined by wheel slip control modules 210, 220 for each of the driven wheels w1, w2, and a smallest torque value $T_{EM}$ is obtained as the minimum of the obtainable torques and the required torque. This torque value $T_{EM}$ is forwarded to the MSD function, where it is used to control the electrical machine torque. It is noted that the 'min' function can be replaced by some more advanced function that determines the torque sent to the electric machine based on the required torque and the obtainable torque values. This function may, e.g., be a weighted combination which favours the smallest torque value by assigning weights accordingly. The function can also involve filtering over time to suppress spurious torque values.

The obtainable torque values $T_1$ and $T_2$ represent how much torque a given wheel can support without entering into severe wheel slip. The actual value is compensated for any geared transmissions and also for the effect of the differential drive arrangement. Thus, the output obtainable torque is normally multiplied by a factor of two to account for the differential drive arrangement which divides torque between the two drive wheels.

This obtainable torque can be determined or estimated in a number of different ways. Also, the obtainable torque can be independently estimated based on a plurality of different information sources. These different estimates can then be merged into a more accurate value for the obtainable torque.

For instance, each wheel slip control module 210, 220 may obtain vehicle velocity $v_x$ from on-board vehicle sensors such as global positioning system receivers, radar sensors, vision-based sensors, and lidar, and wheel rotational velocity co from wheel speed sensors (which can be converted into wheel speed Rω in meters per second if the wheel radius R is known, which of course is normally the case). Current wheel slip can then be determined and compared to a configured wheel slip limit $\lambda_{w1}$, $\lambda_{w2}$ for the wheel. These wheel slip limits can be configured by a slip limit determination module 230. Thus, if a given wheel is slipping and the configured wheel slip limit is breached (or about to be breached), then the obtainable torque $T_1/T_2$ by the wheel can be reduced. Thus, as will be explained below in connection to FIG. 4, a wheel slip limit $\lambda_{w1}$, $\lambda_{w2}$ can often be established which indicates how much wheel slip that can be tolerated by the vehicle in different situations. The obtainable torque $T_1$, $T_2$ can then be adjusted to keep current wheel slip below the wheel slip limit.

The obtainable torque values $T_1$, $T_2$ for each wheel can also be determined based on estimated road friction conditions and the known fundamental relationship $F_{xi}\le\mu_i*F_{zi}$, where $F_{xi}$ is the longitudinal force at wheel i, $\mu_i$ represents an estimated road friction coefficient associated with the i:th wheel, and $F_{zi}$ is an estimated tyre normal force for the i:th wheel, as $$T_i=\mu_i*F_{zi}*r_w$$

where $T_i$ is the obtainable torque value for wheel i and $r_w$ is a wheel radius of wheel i. This obtainable torque value can be used as the obtainable torque $T_1/T_2$ for a given wheel. This obtainable torque value can also be combined with the obtainable torque obtained from wheel slip calculation discussed above. For instance, $T_1/T_2$ can be determined as the smallest of the obtainable torque obtained from the relationship $F_{xi}\le\mu_i*F_{zi}$ and the obtainable torque determined based on current wheel slip and a configured wheel slip limit $\lambda_{w1}$, $\lambda_{w2}$ by the slip limit determination module 230.

The capability information received from an MSD, such as the service brake capability signals $CAP_{SB1}$ and $CAP_{SB1}$, normally comprises minimum and maximum achievable torque assuming 'dry road conditions', i.e., the maximum torque capability sent from a wheel brake will not decrease when it is on a slippery road or if the normal load is small. It instead gives this limit of the actuator itself, so it would only go down if for instance the brake is very hot and cannot generate torque. A wheel brake MSD of the present disclosure, however, optionally also sends its own estimate of the current tyre-road properties, as a separate signal. These tyre road friction properties can then be used by the slip limit determination module 230 along with other information related to the vehicle 100 and its components and/or to the current road conditions to calculate suitable slip limits to be imposed on the left and right hand wheels of the driven axles.

The obtainable torque values can furthermore be obtained directly from the MSD function as part of the capability reports $CAP_{SB1}$ and $CAP_{SB2}$. Some of the more advanced wheel end modules (WEM) maintain relatively detailed data related to current wheel state, including current obtainable torque by the wheel. This obtainable torque will be a function of road friction conditions and normal force, but also of wheel wear, type of tyre and so on. Again, the obtainable torque values $T_1/T_2$ sent to the 'min' function in FIG. 2 can be combined as a function of the different torque values determined based on a number of different information sources, where the capability reports represent one source. The determinations may also, as noted above, comprise peak torque capability with associated time periods.

Methods for estimating obtainable longitudinal force and/or torque by a tyre are known in general and will therefore not be discussed in more detail herein.

In the example 200 there are two driven wheels, but the concepts disclosed herein are applicable also to drive arrangements with more than two wheels on a single axle. The arrangements can also be implemented on, e.g., on an electrically powered dolly unit or the like.

Torque can be both positive (as in propulsion of the vehicle) and negative (as in vehicle braking). The techniques disclosed herein can be applied for both positive and negative torques, and for both positive and negative wheel slips. In fact, according to some aspects that will be discussed below, each of the wheel slip control modules 210, 220 may request braking by issuing a negative brake torque request $T_{SB1}$, $T_{SB2}$ even if the acceleration request $T_{EM}$ is positive. This way uneven friction conditions can be handled without using a differential locking, which may be an advantage.

It is common to have open differentials comprising a differential locking mechanism which locks the wheel speeds to be equal to manage to transfer uneven propulsive and braking wheel force during uneven friction conditions of the left and right side wheel. The main disadvantage with differential locking is that the wheel speeds become equal. This means that turning radius and manoeuvrability is reduced. An illustrative example is uphill driving during a turn. It may be desired to go uphill so the differential is locked, but this then results in reduced manoeuvrability since turning becomes more difficult.

The brake torque requests $T_{SB1}$ and $T_{SB2}$ shown in FIG. 2 may normally be disabled during normal operation. However, if a severe split-friction situation is detected during propulsion, as described herein, the $T_{SB1}$ and $T_{SB2}$ may be used to transfer torque away from the low friction wheel by applying braking to the low-friction wheel. This may contribute to provide an increased overall propulsion torque to the vehicle. As is further described herein, such operation of the powertrain system is performed on the basis of a target wheel slip on the high-friction wheel.

Figure 3:
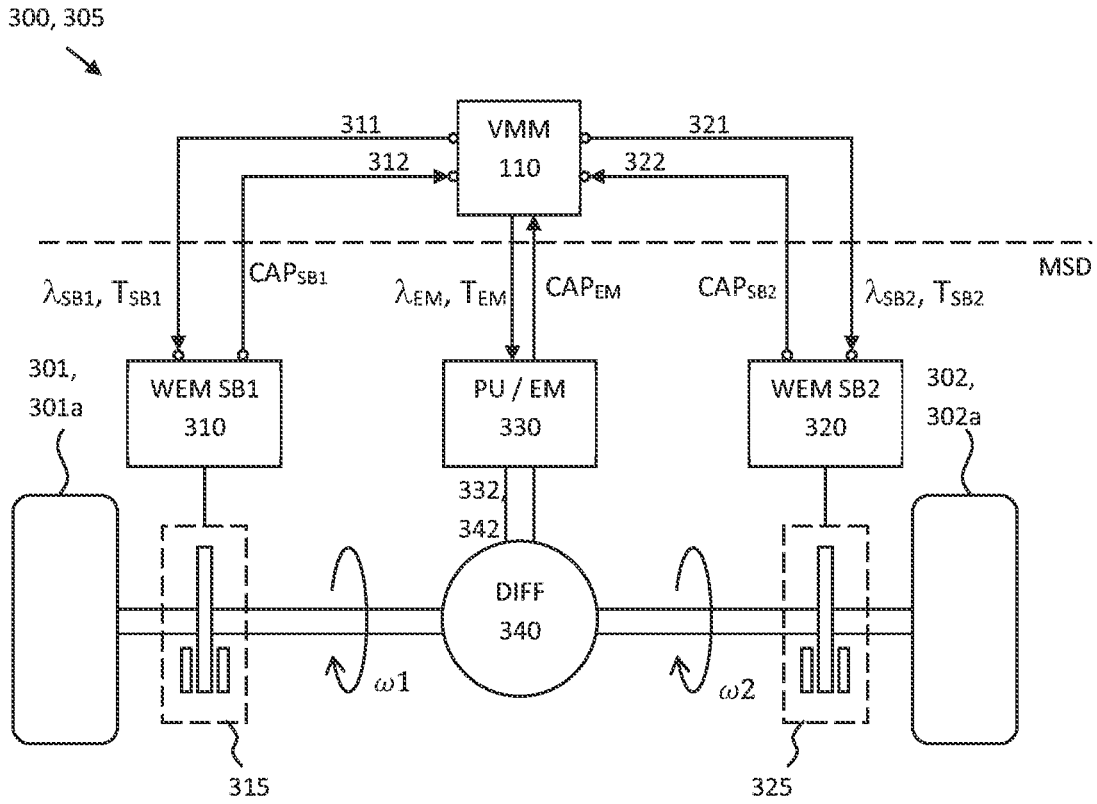
FIG. 3 shows an example vehicle drive arrangement.

FIG. 3 illustrates a brake and propulsion control system 300 for a pair of wheels 301, 302. The brake and propulsion control system 300 is here an integral part of a powertrain system 305 of the vehicle 100. The system 300 comprises a first service brake wheel end module (WEM SB1) 310 arranged to control wheel braking on a first wheel 301 by a first service brake actuator 315, here exemplified by a disc brake. The system also comprises a second service brake wheel end module (WEM SB2) 320 arranged to control wheel braking on a second wheel 302 by a second service brake actuator 325. Each WEM is configured to receive 311, 321 respective wheel slip limits $\lambda_{SB1}$, $\lambda_{SB2}$, and requested service brake torque values $T_{SB1}$, $T_{SB2}$, from a VMM module 110, generally corresponding to the control unit 110.

The WEMs are also arranged to report status and capabilities ($CAP_{SB1}$ and $CAP_{SB2}$) to the VMM 110, as discussed above in connection to FIG. 2.

The propulsion control system 300 of the powertrain system 305 here comprises one or more electric machines EM 330 arranged to drive the first and the second wheel 301, 302 via an open differential arrangement 340. The two wheels are thus driven by the same torque but may have different wheel speeds $\omega_1$ and $\omega_2$.

It is appreciated that the two WEMs 310, 320 may be comprised in a single physical unit, or configured as separate physical units.

Longitudinal wheel slip $\lambda$ may, in accordance with SAE J670 (SAE Vehicle Dynamics Standards Committee, Jan. 24, 2008) be defined as $$\lambda = \frac{R\omega - v_x}{\max(|R\omega|, v_x)}$$

where R is an effective wheel radius in meters, co is the angular velocity of the wheel, and $v_x$ is the longitudinal speed of the wheel (in the coordinate system of the wheel). Thus, $\lambda$ is bounded between −1 and 1 and quantifies how much the wheel is slipping with respect to the road surface. It is noted that wheel slip essentially relates to a speed difference between a wheel and the vehicle (zero slip means that the wheel and vehicle are covering ground at the same speed). It is therefore appreciated that the herein disclosed techniques can be used with advantage together with most measures of speed difference between wheel and vehicle.

The vehicle control unit 110 maintains information on $v_x$ (in the reference frame of the wheel), while a wheel speed sensor or the like can be used to determine co. Notably, in the following, when limits on wheel slip are discussed, it is the magnitude or absolute value of the wheel slip which is limited. I.e., an increased wheel slip limit may either refer to a larger positive allowed wheel slip or a smaller negative allowed wheel slip. The present disclosure mainly considers braking, i.e., the wheel slip is normally negative herein, since $v_x > R\omega$ during braking.

Modern service brake systems and also some electrical machines are capable of fine grained slip control. For instance, some modern brake controllers are able to keep wheel slip $\lambda$ within about +/−0.02 of some nominal value.

Thus, the first and second driven wheels 301, 302 are arranged to be braked by respective first and second service brakes 315, 325. Further, each service brake 315, 325 is configured to be controlled by a respective wheel end module, WEM, 310, 320 to maintain wheel slip below a configured wheel slip limit $\lambda_{SB1}$, $\lambda_{SB2}$. With reference to FIG. 2, the control module 110 is arranged to configure 230 the wheel slip limits $\lambda_{SB1}$, $\lambda_{SB2}$, $\lambda_{EM}$, according to techniques will be discussed in more detail below.

The vehicle control unit 110, e.g., a vehicle motion management (VMM) system, sends brake requests comprising, e.g., requested brake torque and wheel slip magnitude limit, and receives data capability data related to the current capabilities of the wheel end module. The capability data may optionally comprise, e.g., measured wheel slip, peak measured wheel slip, current braking capability in terms of, e.g., brake torque, and in some cases also estimated road friction coefficients. As discussed above, the capability may also comprise peak torque capability and an associated time period for which the peak torque can be sustained by the system.

A WEM then controls braking according to the requested brake torque while keeping wheel slip magnitude below the set wheel slip magnitude limit. This is made possible by the data supplied from the control unit 110 on, e.g., vehicle speed in the frame of reference of the wheel. If wheel slip magnitude exceeds the set slip limit, a slip control strategy which may comprise reducing the wheel torque generated in the brake system is activated such that the wheel recovers to a slip value equal to or less than the set wheel slip magnitude limit. The slip control function can be incorporated in the VMM or into the WEM or in both. According to some aspects, the VMM-based slip control loop uses one slip limit and the WEM uses a larger one. This way the WEM acts as a safety net if VMM fails to prevent excessive wheel lock.

According to some aspects, the control unit 110 is arranged to configure a higher wheel slip limit $\lambda_{SB1}$, $\lambda_{SB2}$ for the service brakes 315, 325 compared to a wheel slip limit of the electric machine $\lambda_{EM}$. This effectively means that the service brakes are used as back-up and will handle more severe wheel slip conditions which the electric machine has not been able to control successfully. This results in a more robust control system. With reference to FIG. 2, the slip limits $\lambda_{w1}$ and $\lambda_{w2}$ sent to the wheel slip control modules 210 and 220 are normally the lowest of all configured slip limits. This means that the slip controllers 210, 220 are first to intervene in a wheel slip situation. Ideally, this slip control is sufficient, such that the other slip control functions of the vehicle 100 do not need to act to reduce wheel slip.

For the case where a braking request is active (where $T_{req}$ in FIG. 2 is negative) the next 'highest' slip limit should normally be that sent to the electric machine, i.e., $\lambda_{EM}$, as the EM 330 has the most freedom to prevent an imminent wheel lock (since it can directly reduce the braking torque applied by the electric machine).

Optionally a wheel motor speed request $\omega_{EM}$ can be sent to the electric machine, in which case the VMM would perform slip control.

The highest wheel slip limit should normally be that sent to the wheel brakes, i.e., $\lambda_{SB1}$, $\lambda_{SB2}$, as in this situation with braking through the EM active the service brakes will have a low possibility to actually reduce the braking torque at the wheel. If the slip limit at either wheel brake is exceeded this should be reported back to the VMM as this may indicate an error with the braking control of the EM, and that a different braking strategy may be needed. For instance, a switch to braking with service brakes only may be preferred in case this situation is detected.

For the case where positive acceleration is requested (where $T_{req}$ in FIG. 2 is positive) the slip limits $\lambda_{w1}$, $\lambda_{w2}$ used by the wheel slip control modules 210 and 220 should normally be the smallest (making those slip controllers the most active in controlling wheel slip). A slightly higher slip limit $\lambda_{EM}$ should normally be sent to the EM, and the highest slip limits $\lambda_{SB1}$, $\lambda_{SB2}$ should normally be sent to the service brake WEMs 310, 320. For the propulsion case it may according to some aspects be acceptable if one service brake momentarily goes into slip control mode where it modifies applied torque to reduce wheel slip, but if both service brakes become active then some other intervention may be required.

It is appreciated that, for the propulsion case (where $T_{req}$ in FIG. 2 is positive), the service brakes 315, 325 can intervene to prevent excessive slip even if the EM continues to generate too much torque, but for the braking case (where $T_{req}$ in FIG. 2 is negative) the service brakes can only reduce their own braking torque in response to excessive wheel slip. If the EM 330 continues to brake hard the wheels could still lock—hence the slip limit sent to the EM is configured to avoid this situation.

Figure 4:
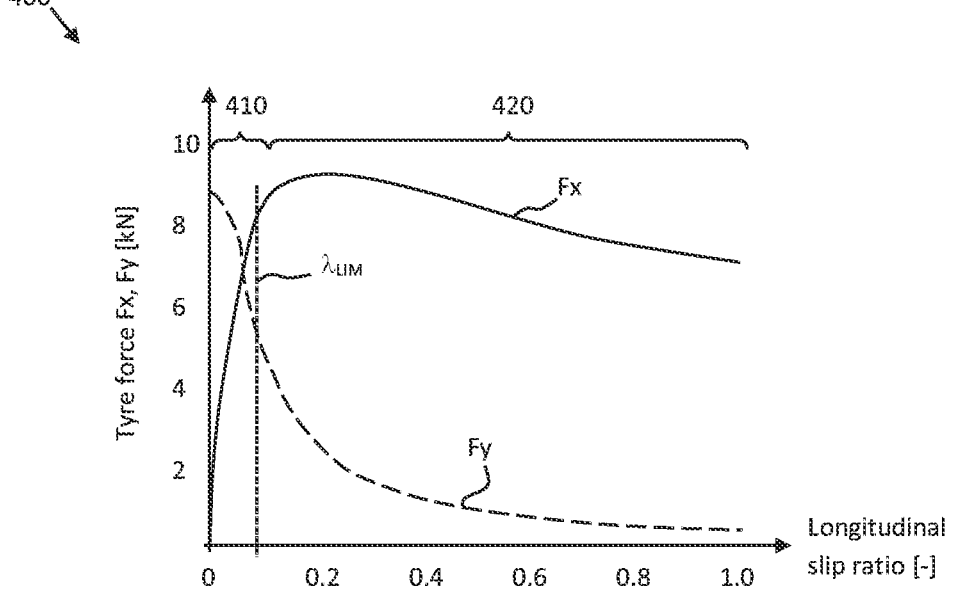
FIG. 4 is a graph illustrating tyre force vs. slip ratio.

FIG. 4 is a graph showing achievable tyre force as function of wheel slip. The longitudinal obtainable tyre force Fx shows an almost linearly increasing part 410 for small wheel slips, followed by a more non-linear behaviour for larger wheel slips. The obtainable lateral tyre force Fy decreases rapidly even at relatively small wheel slips. It is desirable to maintain vehicle operation in the linear region 410, where the obtainable longitudinal force is easier to predict, and where lateral tyre force can be generated if needed. To ensure operation in this region, a wheel slip limit $\lambda_{LIM}$ on the order of, e.g., 0.1, can be imposed on the WEM. If maximum longitudinal force is desired, and no significant lateral forces are needed, then the wheel slip limit can be increased to perhaps 0.3.

By comparing the requested wheel torque to the obtainable wheel torque as determined by the two wheel slip control modules 210, 220, which were discussed above in connection to FIG. 2, it becomes possible to avoid or at least reduce sending too high torque requests to the electric machine 330.

To summarize, FIGS. 2 and 3 show an example of a control unit 110 for a heavy-duty vehicle 100. The vehicle 100 comprises a propulsion unit 330 in the form of an electric machine 330 connected to first and second driven wheels 301, 302 via a differential 340. The control unit 110 comprises a first wheel slip control module 210 associated with the first driven wheel 301, and a second wheel slip control module 220 associated with the second driven wheel 301, where each wheel slip control module 210, 220 is arranged to determine an obtainable torque $T_1$, $T_2$ by the respective wheel based on a comparison between a current wheel state 215, 225 and a target wheel slip for the high-friction side. The control unit 110 is arranged to determine a required torque $T_{req}$ to satisfy a requested acceleration profile $a_{req}$ by the vehicle 100, and to request a torque $T_{EM}$ from the electrical machine 330 corresponding to the smallest torque 230 out of the obtainable torques $T_1$, $T_2$ for each driven wheel 301, 302 and the required torque $T_{req}$.

Methods for determining required torque for satisfying a requested acceleration profile, and/or a requested curvature, are known and will therefore not be discussed in more detail herein. The acceleration profile and curvature may be the result of operating the vehicle autonomously, or they may be the result of a driver manual input (acceleration pedal, brake pedal, and steering wheel inputs).

As mentioned above, there are many different ways in which the obtainable torque for each wheel can be established. These methods may be used as stand-alone methods, or the different methods can be combined in order to obtain more robust obtainable torque values. For instance, a weighted combination of the torque values obtained by the different methods can be used as the final obtainable torque value.

According to one such example, the current wheel state 215, 225 (see FIG. 2) comprises wheel speed $R\omega$. The wheel speed can, for instance, be obtained from a wheel speed sensor configured to measure rotational velocity in terms of revolutions per second, which can be translated into wheel speed based on a known wheel radius R. Each wheel slip control module 210, 220 is also arranged to obtain a vehicle velocity $v_x$ to determine a current wheel slip $\lambda$, and to determine the obtainable torque $T_1$, $T_2$ based on a comparison between the current wheel slip and a configurable wheel slip limit $\lambda_{LIM}$. This configurable wheel slip limit $\lambda_{LIM}$ was exemplified above in FIG. 2 by the configured wheel slip limits $\omega_{w1}$ and $\omega_{w2}$.

Thus, if the current wheel slip is above the slip limit, the obtainable torque is reduced until the current wheel slip is no longer above the slip limit. The obtainable torque values may be determined with some margin, i.e., the obtainable torque can be reduced some time before the current wheel slip actually breaches the configured wheel slip limit. According to another example, the control algorithm for determining obtainable torque can operate based on detected peak wheel slip instead of current wheel slip. Peak wheel slip may, e.g., be defined as the largest detected wheel slip over some time window. The configurable wheel slip limit will be discussed in more detail below.

According to another such example, the current wheel state 215, 225 comprises a current wheel slip value $\lambda$ obtained by the wheel slip control module 210, 220 as part of the capability message ($CAP_{SB1}$, $CAP_{SB2}$, see FIG. 2) received from a wheel end module 310, 320 associated with the respective wheel. Each wheel slip control module 210, 220 is arranged to determine the obtainable torque $T_1$, $T_2$ based on a comparison between the current wheel slip and the configurable wheel slip $\lambda_{LIM}$. The configurable wheel slip was exemplified by $\lambda_{w1}$ and as $\lambda_{w2}$ in FIG. 2 above. The control of the obtainable torque output may be performed as discussed above, i.e., the obtainable torque can be adjusted by a control algorithm such that the current wheel slip (or peak wheel slip) does not exceed the slip limit.

The configurable wheel slip limit $\lambda_{LIM}$ can, for instance, be obtained based on a pre-determined relationship 400 between tyre force and current wheel slip $\lambda$, such as that illustrated in FIG. 4. For instance, if a significant curvature is requested from the TSM layer, then the VMM must deliver a vehicle control which is able to provide lateral forces $F_y$. The configurable wheel slip limit $\lambda_{LIM}$ is then preferably set rather low, e.g., on the order of 0.1, where lateral forces can be generated. On the other hand, if the vehicle is driving straight and needs to generate maximum longitudinal force $F_y$, then a larger wheel slip limit may be preferred, e.g., on the order of 0.2 where longitudinal force is at its peak.

The relationship in FIG. 4 may be pre-determined based on laboratory testing or based on computer simulation of vehicle dynamics. The relationship can also be estimated continuously and thus updated as the vehicle 100 operates. The relationship can be established for a given vehicle type or even for an individual vehicle.

The control unit 110 may also be arranged to obtain an estimated road friction coefficient $\mu_i$ using known methods. The configurable wheel slip limit $\lambda_{LIM}$ can then be obtained based on a pre-determined lookup table indexed by the estimated road friction coefficient $\mu_i$. The look-up table may be pre-determined based on laboratory testing or based on computer simulation of vehicle dynamics. The look-up table can also be estimated continuously as the vehicle operates.

Another example technique for determining obtainable torque is based on the current wheel state 215, 225 comprising an estimated road friction coefficient $\mu_i$ and an estimated tyre normal force $F_{zi}$ for each driven wheel. Road friction and tyre normal force can be estimated based on known methods. Each wheel slip control module 210, 220 is then arranged to determine the obtainable torque $T_1$, $T_2$ based on a relationship $$T_i = \mu_i * F_{zi} * r_{wi}$$

where $r_{wi}$ is a wheel radius of the i:th driven wheel. Optionally, a margin may be applied to the relationship, i.e., the obtainable torque can be determined as $$T_i = \alpha * \mu_i * F_{zi} * r_{wi}$$

where $\alpha$ is a margin factor that can, e.g., assume values on the order of 0.7 to 0.95.

This relationship comes from the fundamental limit on longitudinal force $F_{yi}$ for the i:th wheel set by the road friction coefficient and the normal force for that wheel $$F_{yi} \leq \mu_i * F_{zi}$$

According to other aspects, each wheel slip control module 210, 220 is arranged to obtain a capability message $CAP_{SB1}$, $CAP_{SB2}$ from a wheel end module 310, 320 associated with the respective driven wheel 301, 302, wherein the capability message $CAP_{SB1}$, $CAP_{SB2}$ comprises the obtainable torque $T_1$, $T_2$. In this case the obtainable torque has already been estimated or otherwise determined at the MSD function, and is just reported back up to the VMM function. The wheel slip control modules may then just forward the obtainable torque reported from the MSD function.

A problem with differential drive arrangements may be that wheel speed tends to increase significantly on one side of the vehicle if the vehicle encounters a split friction scenario where one side of the road has a reduced friction coefficient compared to the other side of the road. This may, for instance, be the case if the vehicle drives over some ice or if one side of the vehicle is on a muddy road shoulder. Split friction conditions can be detected by means of comparing, e.g., the wheel speeds $\omega_1$ and $\omega_2$ indicated in FIG. 3. When encountering a split friction condition during propulsion, where one or more wheels start to slip, i.e., too large positive slip, the VMM 110 may optionally issue a brake command ($T_{SB1}$ or $T_{SB2}$) by requesting negative torque from the service brake 315, 325 associated with the slipping wheel. This applied negative torque will slow down the slipping wheel and effectively transfer power over to the wheel which is not slipping. The amount of slipping allowed on one side of the vehicle depends on the driving scenario. With reference again to FIG. 4, if maximum propulsion force is desired, then a wheel slip limit on the order of 0.2-0.3 or so may be configured. On the other hand, if lateral forces are needed, and/or if linear vehicle behaviours are desired, then the wheel slip limit is configured lower, e.g., around 0.1. To summarize, as will be further described herein, the control unit 110 is arranged to detect a split friction condition. Each wheel slip control module 210, 220 is arranged to configure a torque $T_{SB1}$, $T_{SB2}$ to be applied by a corresponding service brake 315, 325 to maintain positive wheel slip below a wheel slip limit $\lambda_{SB1}$, $\lambda_{SB2}$, when having detected a split friction condition.

Optionally, the control unit 110 is also arranged to reduce the requested torque $T_{EM}$ from the electrical machine 330 in case both of the wheel slip control modules 210, 220 configures a torque $T_{SB1}$, $T_{SB2}$ to be applied by the corresponding service brake 315, 325 in response to a positive wheel slip above the configured wheel slip limit $\lambda_{SB1}$, $\lambda_{SB2}$. Naturally, it does not make sense to brake both wheels while the electric machine at the same time drives the wheels.

FIGS. 6A-B are flow charts which summarize and exemplify the discussions above. The methods are here performed by the control unit 110 of the vehicle 100. By way of example, the methods are integral parts of the VMM function of the control unit 110. VCU 130, 140 in the vehicle 100, or at least in part by the remote server 150. This VCU may be implemented in a central processing unit or distributed over several units.

For ease of reference, a method 500 according to one example embodiment is described in relation to the vehicle 100 illustrated in e.g. FIG. 1A. The method 500 may likewise be implemented in a vehicle 100 as illustrated in FIG. 1B.

Turning now to FIG. 6A, there is illustrated one general example of the method 500 for controlling a powertrain system 305 of the heavy-duty vehicle 100. The powertrain system 305 comprises at least the propulsion unit 330 and the differential arrangement 340 for receiving torque from the propulsion unit 330. The propulsion unit 330 is configured to output a rotational speed via an output shaft 332. In other words, the propulsion unit 330 is configured to output a rotational speed via the output shaft 332 to an input axle 342 of the differential arrangement 340.

The differential arrangement 340 is also configured to deliver at least a part of the torque to the set of the first and second wheels 301, 302.

In FIG. 6A, the method comprises a step of determining S10 a split-friction condition indicative of a wheel slip difference between the first and second wheels 301, 302. One of the first and second wheels defines a high-friction side of the differential arrangement 340 and the other one of the first and second wheels defines a low-friction side of the differential arrangement 340. By way of example, the first wheel 301 is the high-friction wheel whilst the second wheel 302 is the low-friction wheel. The split-friction condition is defined by a difference in wheel slip between a high-friction wheel side 301*a* and a low-friction wheel side 302*a*. The high-friction wheel side 301*a* amounts to the wheel rotating with the lowest wheel speed among the first and second wheels, while the low-friction wheel side 302*a* amounts to the wheel rotating with the highest wheel speed among the first and second wheels.

The split-friction condition is here detected by monitoring the individual wheel speeds of the first and second wheels 301, 302. The individual wheel speeds of the first and second wheels 301, 302 can be determined in several different ways, as mentioned herein. By way of example, the individual wheel speeds of the first and second wheels 301, 302 are determined by wheel speeds sensors (not shown) arranged to determine a wheel speed of one or more wheels. In addition, the control unit 110 is here configured to compare the wheel speeds of the first and second wheels 301, 302 with each other. The split-friction condition is determined by estimating the difference in slip between the high-friction wheel side 301a and the low-friction wheel side 302a on the basis of the monitored individual wheel speeds of the first and second wheels 301, 302.

Further, the method comprises a step of determining S20 a target wheel slip for the high-friction side. The target wheel slip for the high-friction wheel side 301a can be determined in several different ways. By way of example, the target wheel slip corresponds to the configurable wheel slip limit $\lambda_{LIM}$, as mentioned herein. The target wheel slip, e.g. the configurable wheel slip limit, can be obtained based on the pre-determined relationship 400 between tyre force and current wheel slip $\lambda$. Alternatively, or in addition, the target wheel slip, e.g. the configurable wheel slip limit, can be obtained based on a pre-determined lookup table indexed by the estimated road friction coefficient $\mu_i$.

In response to the determined split-friction condition, the method 500 comprises a step of controlling S30 a brake force on the low-friction side 302a of the differential arrangement 340 based on the target wheel slip on the high-friction side 301a. As such, a magnitude of the brake force on the low-friction side 302a of the differential arrangement 340 is determined on the basis of the determined target wheel slip on the high-friction side 301a.

In other words, the control unit 110 is configured to detect the split-friction condition by supervision of the individual wheel speeds and further configured to control the brake force, using the determined target wheel slip of the high friction side of the differential arrangement 340 as an input control parameter. In this manner, it becomes possible to improve the traction control of the powertrain system 305 and the vehicle 100.

The control of the brake force on the low-friction side 302a of the differential arrangement 340 can be performed in several different ways, e.g. by braking the wheel/tyre by means of the service brake 325 and the wheel end module 320 associated with the driven wheel 302. As such, the provision of controlling the brake force generally refers to controlling brake pressure of a brake unit and/or controlling brake torque of a wheel end module.

Accordingly, the method optionally comprises controlling S30 the brake force on the low-friction side 302a of the differential arrangement 340 by requesting a brake torque from the service brake 325 associated with the low-friction side 302a. By way of example, the method comprises controlling S30 the brake force on the low-friction side 302a of the differential arrangement 340 by controlling a brake pressure of the service brake 325.

In addition, the method here comprises controlling the brake force on the low-friction side of the differential arrangement 340 by controlling the revolution of the input axle 342 of the differential arrangement 340 based on the determined target wheel slip for the high-friction side 301a. This is generally obtained by controlling the revolution of the propulsion unit output shaft 332 of the propulsion unit 330 based on the target wheel slip on the high-friction side.

In other words, the brake force on the low friction side 302a is controlled by the service brake 325, and the revolution of the input axle 342 to the differential arrangement 340 is controlled on the basis of the target wheel slip for the high-friction side 301a.

Typically, the brake force on the low-friction side 302a of the differential arrangement 340 is controlled until a wheel speed at the high friction side 301a agrees with the determined target wheel slip on the high-friction side 301a. In other words, the braking force is dynamically controlled to obtain the target wheel slip at the high friction side.

In certain driving operations, the wheel slip on the first wheel 301, i.e. the high-friction wheel side 301a may vary to a high degree and occasionally exceed the target wheel slip. Accordingly, the method may optionally further comprise a step of reducing S40 a torque from the propulsion unit 330 based on the target wheel slip on the high-friction side 301a, if a wheel slip on the high-friction side exceeds the target wheel slip on the high-friction side. In other words, if there is an overshoot of slip on the high friction side as an effect of too much brake torque, the wheel slip controller is configured to use the spinning wheel as a target (limit) and reduce the torque. The brake pressure will also decrease due to the speed controller aiming for a certain wheel slip target.

To sum up, once the slip friction condition is detected, the control unit 110 and optionally the wheel slip controller are configured to limit the high friction side wheel 301 and the output shaft speed of the propulsion unit 330. As the high friction side wheel 301 may likely have close to 0% wheel slip to start with, the propulsion unit limitation will act on the low friction side wheel 302 by the output shaft speed. The brake torque should further be controlled to towards the target slip on the high friction side wheel 301, hence forcing the torque to transfer. The brake torque will adjust if the high friction side wheel slip overshoots. Moreover, the propulsion unit torque may also reduce if the high friction side wheel slip overshoots.

As mentioned herein, the split-friction condition is detected by monitoring the individual wheel speeds of the first and second wheels and further comparing the wheel speeds of the first and second wheels with each other.

Moreover, it should be noted that the propulsion unit 330 may necessarily not be an electric machine. In some examples, the propulsion unit may be a fuel cell system or an internal combustion engine. Hence, the propulsion unit may in general be provided by any type of energy converter unit suitable for providing traction power to a heavy-duty vehicle. Accordingly, the propulsion unit is any one of an electric machine, a fuel cell system, an internal combustion engine or a combination thereof.

Also, as will be further described in relation to FIG. 6B, the method generally comprises using the first wheel slip control module 210 associated with the first driven wheel 301 and the second wheel slip control module 220 associated with the second driven wheel 302 to control the powertrain system.

Hence, turning now to FIG. 6B, there is illustrated an extended version of the method described in relation to FIG. 6A. The method illustrated in FIG. 6B comprises the steps of the method in FIG. 6A and an additional number of optional steps of the method.

In this example, the method further comprises a step of configuring S2 a first wheel slip control module 210 associated with the first driven wheel 301, and a second wheel slip control module 220 associated with the second driven wheel 302.

Moreover, the method comprises a step of determining S3, by each wheel slip control module 210, 220, an obtainable torque T1, T2 for the respective wheel based on a comparison between current wheel state 215, 225 and target wheel slip for the high-friction side.

In addition, the method comprises a step of receiving S4 a requested acceleration profile areq by the vehicle 100 and a step of determining S5 a required torque Treq to satisfy the requested acceleration profile areq.

Also, the method comprises a step of requesting S6 a torque TEM from the propulsion unit 330 corresponding to the smallest torque 230 out of the obtainable torques T 1, T2 for each driven wheel 301, 302 and the required torque Treq.

It should be noted that the above steps S2 to S6 may generally relate to further controlling the operation of the powertrain system and the vehicle. In addition, it should be noted that the steps S2 to S6 may be performed prior to, concurrently with, or subsequent to the previous steps S10 to S40.

As mentioned herein, the method may further comprise receiving additional data, such as a current wheel state 215, 225 comprising wheel speed R$\omega$, obtaining a vehicle velocity $v_x$, determining a current wheel slip $\lambda$, and determining the obtainable torque $T_1$, $T_2$.

As mentioned herein, the method may further comprise receiving a current wheel state 215, 225 comprising a current wheel slip value $\lambda$ obtained by the wheel slip control module 210, 220 as part of a capability message $CAP_{SB1}$, $CAP_{SB2}$ received from a wheel end module 310, 320 associated with the respective wheel, and determining the obtainable torque $T_1$, $T_2$.

As mentioned herein, the method may further comprise receiving a current wheel state 215, 225 comprising an estimated road friction coefficient $\mu_i$ and an estimated tyre normal force $F_{zi}$ for each driven wheel, and determining the obtainable torque $T_1$, $T_2$ based on a relationship $$T_i = \mu_i * F_{zi} * r_{wi}$$

where $r_{wi}$ is a wheel radius of the i:th driven wheel. It is appreciated that both the WEM and the VMM can perform a friction estimation either jointly or separately based on known techniques.

FIG. 5 shows a brief example of a scenario 600 where the semi-trailer vehicle 100 accelerates along a straight stretch of road 610. The TSM function here requests positive acceleration in order to increase vehicle velocity, and this request is translated by the VMM function into a requirement for positive torque. However, the left wheels on the tractor unit 101 are here subject to reduced friction conditions, due to a spot of ice 630. Thus, the vehicle is in a split friction condition. However, due to the techniques disclosed herein, the vehicle 100 can still provide a reliable traction force to the wheels by controlling a brake force on the left driven wheel/wheels (i.e. on the low-friction side of the differential arrangement) and by controlling the output torque from the propulsion unit 330 (e.g. the electric machine(s)) to the differential arrangement 340 based on the determined target wheel slip on the high-friction side.

FIG. 7 schematically illustrates, in terms of a number of functional units, the components of a control unit 110 according to embodiments of the discussions herein. This control unit 110 may be comprised in the vehicle 100, e.g., in the form of a VMM unit. Processing circuitry 810 is provided using any combination of one or more of a suitable central processing unit CPU, multiprocessor, microcontroller, digital signal processor DSP, etc., capable of executing software instructions stored in a computer program product, e.g. in the form of a storage medium 830. The processing circuitry 810 may further be provided as at least one application specific integrated circuit ASIC, or field programmable gate array FPGA.

Particularly, the processing circuitry 810 is configured to cause the control unit 110 to perform a set of operations, or steps, such as the methods discussed in connection to FIGS. 6A and 6B. For example, the storage medium 830 may store the set of operations, and the processing circuitry 810 may be configured to retrieve the set of operations from the storage medium 830 to cause the control unit 110 to perform the set of operations. The set of operations may be provided as a set of executable instructions. Thus, the processing circuitry 810 is thereby arranged to execute methods as herein disclosed.

The storage medium 830 may also comprise persistent storage, which, for example, can be any single one or combination of magnetic memory, optical memory, solid state memory or even remotely mounted memory.

The control unit 110 may further comprise an interface 820 for communications with at least one external device such as a WEM or the like. As such the interface 820 may comprise one or more transmitters and receivers, comprising analogue and digital components and a suitable number of ports for wireline or wireless communication.

The processing circuitry 810 controls the general operation of the control unit 110, e.g., by sending data and control signals to the interface 820 and the storage medium 830, by receiving data and reports from the interface 820, and by retrieving data and instructions from the storage medium 830. Other components, as well as the related functionality, of the control node are omitted in order not to obscure the concepts presented herein.

FIG. 8 illustrates a computer readable medium 910 carrying a computer program comprising program code means 920 for performing the methods illustrated in FIG. 7, when the program product is run on a computer. The computer readable medium and the code means may together form a computer program product 900.

Also, although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for controlling a powertrain system of a heavy-duty vehicle, the powertrain system having at least one differential arrangement for receiving torque from a propulsion unit of the powertrain system and delivering at least a part of the torque to a set of first and second wheels, the method being implemented by a control unit and comprising:

determining a split-friction condition across a differential indicative of a wheel slip difference between the first and the second wheels by comparing a first wheel speed of the first wheel to a second wheel speed of the second wheel;

identifying the first wheel as a high-friction side of the differential arrangement and the second wheel as a low-friction side of the differential arrangement;

determining a target wheel slip for the high-friction side based on a relationship between a longitudinal tire force and a lateral tire force, the longitudinal tire force and the lateral tire force at least partially based on a road condition; and in response to the determined split-friction condition, controlling a brake force on the low-friction side of the differential arrangement to obtain the target wheel slip on the high-friction side.

2. The method of claim 1, wherein controlling the brake force on the low-friction side of the differential arrangement comprises controlling the revolution of an input axle of the differential arrangement based on the target wheel slip for the high-friction side.

3. The method of claim 1, wherein controlling the brake force on the low-friction side of the differential arrangement comprises controlling a brake pressure from the service brake.

4. The method of claim 1, wherein, if a wheel slip on the high-friction side exceeds the target wheel slip on the high-friction side, the method further comprises reducing a torque from the propulsion unit based on the target wheel slip on the high-friction side.

5. The method of claim 1, further comprising monitoring the individual wheel speeds of the first and the second wheels by using one or more wheel speeds sensors arranged and configured to determine corresponding wheel speeds of the first and the second wheels.

6. The method of claim 1, wherein the propulsion unit comprises any one of an electric machine, an internal combustion engine, and a fuel cell system.

7. The method of claim 1, further comprising:

configuring a first wheel slip control module associated with the first driven wheel, and a second wheel slip control module associated with the second driven wheel, determining, by each wheel slip control module, an obtainable torque for the respective wheel based on a comparison between current wheel state and target wheel slip for the high-friction side, receiving a requested acceleration profile by the vehicle, determining a required torque to satisfy the requested acceleration profile, and requesting a torque from the propulsion unit corresponding to the smallest torque out of the obtainable torques for each driven wheel and the required torque.

8. A control unit for performing the method of claim 1.

9. A vehicle comprising the control unit of claim 8.

10. A computer program comprising program code means for performing the method of claim 1 when the program is run on a computer or on processing circuitry of a control unit.

11. The method of claim 1, wherein the target wheel slip is set in response to required lateral force for steering or linear vehicle behavior, and longitudinal force for propulsion.

12. The method of claim 1, wherein the target wheel slip is set lower when lateral forces are required for steering or linear vehicle behavior, and higher when maximum longitudinal force is required for propulsion.

* * * * *